United States Patent
Pituwala Kankanamge et al.

(10) Patent No.: US 12,530,577 B2
(45) Date of Patent: Jan. 20, 2026

(54) TRAINING DEVICE, INFERRING DEVICE, TRAINING METHOD, INFERRING METHOD, AND NON-TRANSITORY COMPUTER READABLE MEDIUM

(71) Applicant: Preferred Networks, Inc., Tokyo (JP)

(72) Inventors: Kaushalya Madhawa Pituwala Kankanamge, Tokyo (JP); Kosuke Nakago, Tokyo (JP); Katsuhiko Ishiguro, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 1126 days.

(21) Appl. No.: 17/508,592

(22) Filed: Oct. 22, 2021

(65) Prior Publication Data

US 2022/0044121 A1 Feb. 10, 2022

Related U.S. Application Data

(63) Continuation of application No. PCT/JP2020/003052, filed on Jan. 28, 2020.

(30) Foreign Application Priority Data

Apr. 24, 2019 (JP) .................. 2019-082977

(51) Int. Cl.
G06N 3/0455 (2023.01)
G06F 18/214 (2023.01)
G06N 3/045 (2023.01)
G06N 3/08 (2023.01)

(52) U.S. Cl.
CPC ............. *G06N 3/08* (2013.01); *G06F 18/214* (2023.01); *G06N 3/045* (2023.01)

(58) Field of Classification Search
CPC .......... G06N 3/08; G06N 3/045; G06N 3/042; G06N 3/0475; G06F 18/214
See application file for complete search history.

(56) References Cited

U.S. PATENT DOCUMENTS

| | | | |
|---|---|---|---|
| 2020/0110777 A1* | 4/2020 | Yin | G06F 16/9024 |
| 2020/0334495 A1* | 10/2020 | Al-Rfou | G06N 3/084 |
| 2020/0401916 A1* | 12/2020 | Rolfe | G06N 7/01 |
| 2021/0027864 A1* | 1/2021 | Plumbley | G16C 20/30 |
| 2021/0081804 A1* | 3/2021 | Stojevic | G06N 3/088 |

(Continued)

OTHER PUBLICATIONS

Jin et al "Learning Multimodal Graph-to-Graph Translation for Molecular Optimization", dated Jan. 2019, and retrived from https://arxiv.org/abs/1812.01070v3 (Year: 2019).*

(Continued)

*Primary Examiner* — Sanchita Roy

(74) *Attorney, Agent, or Firm* — Foley & Lardner LLP

(57) ABSTRACT

A training device comprises one or more memories and one or more processors. The one or more processors are configured to train a first converter that converts a first feature amount regarding a node of a graph and a second feature amount regarding a structure of the graph into a first latent value through conversion capable of defining inverse conversion, and a second converter that converts the second feature amount into a second latent value through conversion capable of defining inverse conversion, based on the first latent value and the second latent value.

21 Claims, 8 Drawing Sheets

(56) References Cited

U.S. PATENT DOCUMENTS

2022/0383992 A1* 12/2022 Triendl .................. G06N 3/045

OTHER PUBLICATIONS

Aviral Kumar et al., "GRevnet: Improving Graph Neural Nets with Reversible Computation", Relational Representation Learning Workshop at 32nd Conference on Neural Information Processing Systems (NIPS 2018).

Diederik P. Kingma et al., "Auto-Encoding Variational Bayes", arXiv:1312.6114v10 [stat.ML] May 1, 2014.

Diederik P. Kingma et al., "Glow: Generative Flow with Invertible 1×1 Convolutions", arXiv:1807.03039v2 [stat.ML] Jul. 10, 2018.

Ian J. Goodfellow et al., "Generative Adversarial Nets", arXiv:1406.2661v1 [stat.ML] Jun. 10, 2014.

Jiaxuan You et al., "Appendix for GraphRNN: Generating Realistic Graphs with Deep Auto-regressive Models", Proceedings of the 35th International Conference on Machine Learning, Stockholm, Sweden, PMLR 80, 2018.

Jiaxuan You et al., "Graph Convolutional Policy Network for Goal-Directed Molecular Graph Generation", 32nd Conference on Neural Information Processing Systems (NeurIPS 2018) Montréal, Canada.

Jiaxuan You et al., "GraphRNN: Generating Realistic Graphs with Deep Auto-regressive Models", Proceedings of the 35th International Conference on Machine Learning, Stockholm, Sweden, PMLR 80, 2018.

Laurent Dinh et al., "Density Estimation Using Real NVP", arXiv:1605.08803v3 [cs.LG] Feb. 27, 2017.

Laurent Dinh et al., "NICE: Non-linear Independent Components Estimation", arXiv:1410.8516v6 [cs.LG] Apr. 10, 2015.

Michael Schlichtkrull et al., "Modeling Relational Data with Graph Convolutional Networks", arXiv:1703.06103v4 [stat.ML] Oct. 26, 2017.

Nicola De Cao et al., "MolGAN: An implicit generative model for small molecular graphs", arXiv:1805.11973v1 [stat.ML] May 30, 2018.

Rafael Gomez-Bombarelli et al., "Automatic Chemical Design Using a Data-Driven Continuous Representation of Molecules", ACS Central Science, 2018, 4, 268-276.

GraphRNN: Generating Realistic Graphs with Deep Auto-regressive Models http://web archive.org/web/20180711025304/http://proceedings.mlr.press/v80/you18a.html Jul. 11, 2018 Version, Abstract.

Prafulla Dhariwal et al., "Glow: Better Reversible Generative Models", https://web.archive.org/web/20190311213439/https://openai.com/blog/glow/ Mar. 11, 2019 Version.

Wengong Jin et al., "Junction Tree Variational Autoencoder for Molecular Graph Generation", The 35th International Conference on Machine Learning, Stockholm, Sweden, PMLR 80, 2018.

Wengong Jin et al., "Junction Tree Variational Autoencoder for Molecular Graph Generation", The 35th International Conference on Machine Learning, Stockholm, Sweden, PMLR 80, 2018, arXiv: 1802.04364v4 [cs.LG] Mar. 29, 2019.

* cited by examiner

TRAINING DEVICE, INFERRING DEVICE, TRAINING METHOD, INFERRING METHOD, AND NON-TRANSITORY COMPUTER READABLE MEDIUM

CROSS REFERENCE TO RELATED APPLICATIONS

This application is continuation application of International Application No. PCT/JP2020/003052, filed on Jan. 28, 2020, which claims priority to Japanese Patent Application No. 2019-082977, filed on Apr. 24, 2019, the entire contents of which are incorporated herein by reference.

FIELD

The embodiment relates to a training device, an inferring device, a training method, an inferring method, and a non-transitory computer readable medium.

BACKGROUND

A graph data generation model is a mathematical model including an algorithm of generating, when appropriate random numbers and the like are input therein, data having a graph structure. For example, the graph data generation model can be utilized for generation of candidate substances generated by calculating machines when creating new compounds and medical substances, and so on. Studies of this graph data generation model have been rapidly developed in recent years. As typical examples of a structure and training of the graph data generation model, there can be cited two, which are Variational AutoEncoder (VAE) and Generative Adversarial Networks (GAN). Further, as procedures for generating graph data, there can be cited an incremental method in which a node is added one by one or deleted to or from a graph, and a one-shot method in which an amount representing a relation of all nodes is generated at a time.

DETAILED DESCRIPTION

Figure 1:
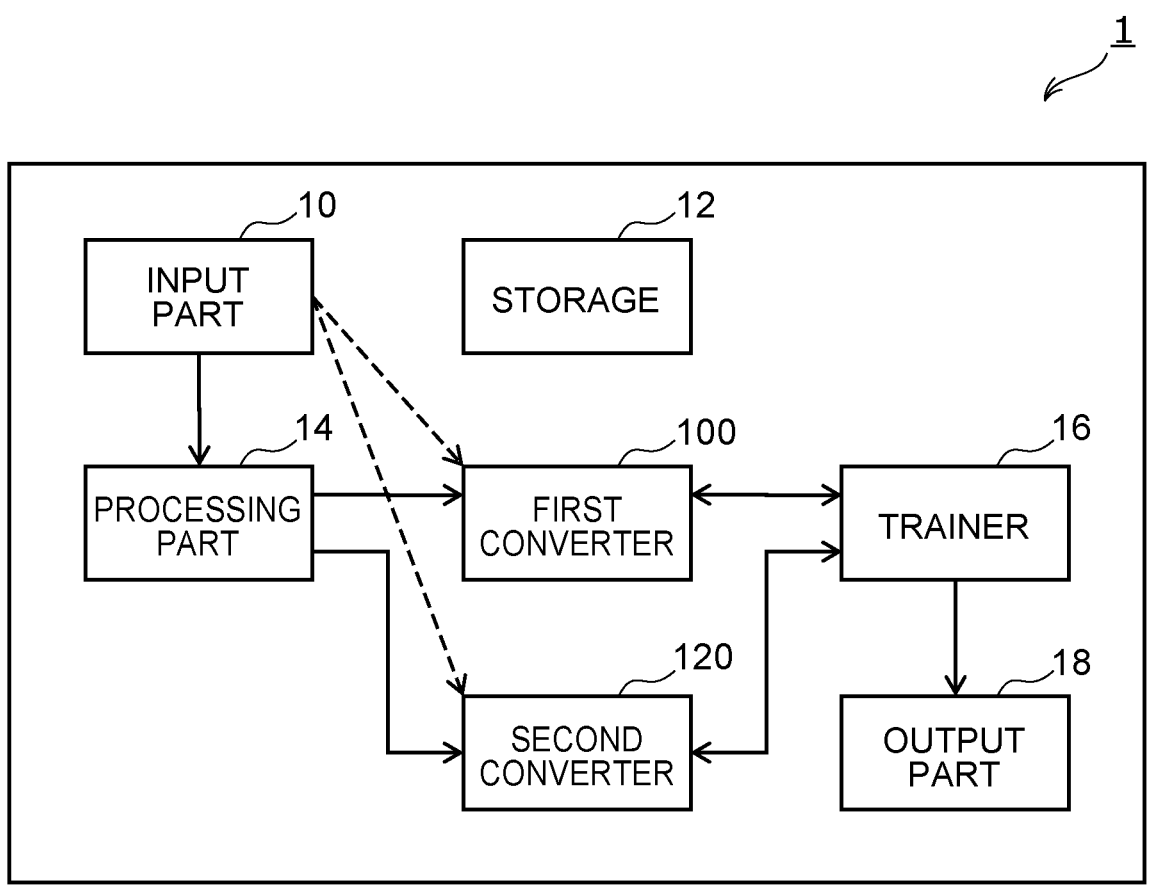
FIG. 1 is a block diagram illustrating a function of a training device according to an embodiment.

According to one embodiment, a training device comprises one or more memories and one or more processors. The one or more processors are configured to train a first converter that converts a first feature amount regarding a node of a graph and a second feature amount regarding a structure of the graph into a first latent value through conversion capable of defining inverse conversion, and a second converter that converts the second feature amount into a second latent value through conversion capable of defining inverse conversion, based on the first latent value and the second latent value.

Hereinafter, embodiments of the present invention will be explained while referring to the drawings. The explanation of the drawings and the embodiments are presented as an example, and does not limit the present invention. The explanation will be made by citing an example of a compound, but an application range of the present embodiment is not limited to this. For instance, as other examples, the present invention can be applied to various kinds of graphs in a circuit design, infrastructure building such as a transportation system or network, architecture, linguistics, a web, and so on. Further, also in a case of a compound, explanation will be made by setting that an element of a node is an atom. However, the element is not limited to this and may also be, for example, a meaningful set represented by a molecule, a group or radical, and the like.

FIG. 1 is a block diagram illustrating a function of a training device 1 according to an embodiment. The training device 1 includes an input part 10, a storage 12, a processing part 14, a trainer 16, and an output part 18. The training device 1 includes, other than the above, a first converter 100 and a second converter 120 which are data converters converting data and which become training targets of the training device 1. Note that it is also possible to configure that the first converter 100 and the second converter 120 are provided outside the training device 1 and can be referred to from the training device 1. Further, it is also possible to configure that the storage 12 is provided outside the training device 1 and can be referred to from the training device 1.

The input part 10 acquires data regarding a graph. Namely, the input part 10 functions as an acquirer that acquires data. The data regarding the graph may be data of nodes and edges, or data which is divided into data of a tensor indicating a feature of node and data of a tensor indicating an adjacent state. Namely, a format of the data is not limited as long as the data is one from which a feature amount of node of a graph and an adjacent state can be obtained. The adjacent state is an amount of state indicating coupling of nodes, and includes an adjacency matrix, for example. Besides, in a case of a compound, the adjacent state may also be an amount which takes a double bond, a triple bond, and the like into consideration. Note that for a graph of a compound, an undirected graph is generally employed, but the present embodiment can be applied to a directed graph as well by adding an amount of directed state to a tensor indicating an adjacent state.

The storage 12 stores data such as training data to be required for processing. The storage 12 may store data acquired by the input part 10. Further, the storage 12 may also store parameters that configure various kinds of networks to be training targets. Besides, when software processing of the training device 1 is concretely executed by using hardware, the storage 12 may also store programs, binary data, and the like required for the execution. In this case, it is also possible to execute the processing when a processor reads an executable file stored in the storage 12.

The processing part 14 processes, when data acquired by the input part 10 is not a first tensor indicating a feature amount of node of a graph and a second tensor indicating a structure of the graph, the data into the first tensor and the second tensor.

Figure 2:
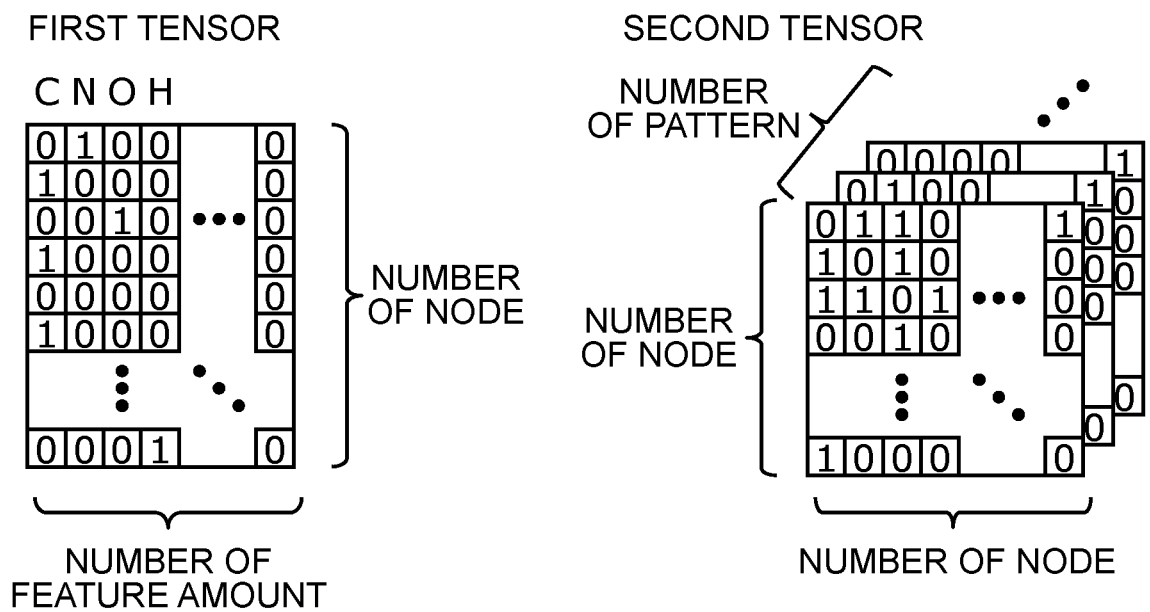
FIG. 2 is a diagram illustrating tensors according to an embodiment.

FIG. 2 illustrates an example of a first tensor and a second tensor. Ruled lines illustrated in the drawing are drawn so as to make the drawing to be easily viewable, and an element of the tensor is indicated by a numeric value surrounded by the ruled lines. The first tensor is represented as, for example, a matrix having dimensions of (number of feature amount)×(number of node). In a case of a compound, as an example, a node feature amount is an atom (for example, atoms of carbon, nitrogen, oxygen, and hydrogen, respectively), and the first tensor is a matrix indicating that which atom exists in each node. In this case, one atom represented by 1 exists in each node, and this atom represented by 1 means an atom configuring each node.

On the other hand, the second tensor is, for example, a tensor having dimensions of (number of node)×(number of node)×(number of pattern), and is represented as a tensor including adjacency matrices by the number of patterns. A first pattern represents single-bonded nodes, and a second pattern represents double-bonded nodes. For example, regarding the second tensor illustrated in FIG. 2, a relation between the first node and the second node is indicated by 1 in the first pattern and the second pattern, and is indicated by 0 in the third pattern, so that it is indicated that the nodes are double-bonded. In like manner, a relation between the first node and the third node is indicated by 1 in the first pattern, and is indicated by 0 in the second pattern, so that it is indicated that the nodes are single-bonded. Not limited to such a matrix representation, and it is also possible to design such that, for example, the first pattern is set to 1 and the other patterns are set to 0 in a case of single bond, and the second pattern is set to 1 and the other patterns are set to 0 in a case of double bond. Further, it is also possible to further include patterns indicating n bond, a bond, and the like regarding adjacent nodes, for example.

The processing part 14 processes, when data input by the input part 10 does not have a structure as illustrated in FIG. 2, for example, the data so as to have the structure as illustrated in FIG. 2. For example, when atoms of nodes and data indicating a state of edges coupling the respective nodes are input in the processing part 14, the processing part 14 processes the atoms of nodes as a first tensor, and checks whether or not the respective edges indicate multiple bonds based on the data indicating the state of edges, to process the data indicating the state of edges as a second tensor indicating a coupling state of respective nodes. Not limited to this, and data representing the drawing of the structural formula, or data indicating the structural formula in an XML format, may also be input in the processing part 14. Not limited to this, and data to be input may be any data as long as it is data which correctly represents a graph, and there may be plural processing parts 14 based on a format of the data to be input. The processing part 14 may perform the above processing by using a rule-based conversion equation or by using a learned model (trained model) after being subjected to training (learning) through machine learning.

Further, when the first tensor and the second tensor are input in the input part 10, or a value obtained by simply combining the first tensor and the second tensor is input in the input part 10, the processing part 14 is not an essential component. In this case, as indicated by a dotted line in FIG. 1, the value may be directly output from the input part 10 to the first converter 100 and the second converter 120. Further, it is also possible that, regardless of the presence/absence of the processing part 14, the data acquired by the input part 10 is at least temporarily stored in the storage 12, and is referred to by the processing part 14 or the respective converters when needed.

The first converter 100 and the second converter 120 are represented by using mapping capable of easily defining inverse mapping, for example, NVP (Non-volume Preserving) mapping. The first converter 100 and the second converter 120 may also be represented by using, for example, nonlinear mapping or mapping to be applied plural times. Hereinafter, concrete mapping will be described as an example, but the mapping according to the present embodiment is not limited to this. In the present embodiment, the mapping based on the NVP mapping is set to be expressed by the following equation.

$$x = x \odot \exp(s(x)) + t(x) \qquad \text{(eq. 1)}$$

Here, each of s(x) and t(x) is arbitrary mapping, and a symbol of ○ with • added therein (odot) indicates a Hadamard product (product of mutual elements). It is not difficult to perform learning even by using complicated mapping in a machine learning model, particularly deep neural network or the like, for example. In the present embodiment, it is set that graph data can be applied to this mapping. Hereinafter, N is set to the number of node, M is set to the type of atom (number of feature amount), and P is set to the type of bond (number of pattern). The values of these N, M, P are set to be predetermined values in training and inference. By setting the values to the predetermined values, it becomes possible to execute conversion from graph data into latent values (and later-described inverse conversion) in a one-shot method.

The first converter 100 converts the first tensor and the second tensor into a first latent value. This conversion is executed by conversion mapping including a neural network capable of processing graph data based on the mapping of (eq. 1), for example. The following mapping is repeated $L_1$ times so as to update the first latent value with respect to the first tensor at least one time, to thereby calculate the first latent value from the first tensor and the second tensor.

$$z_X[f_{update},:] = z_X[f_{update},:] \odot \exp(s_f(z_X[f_{param},:],A)) + t_f(z_X[f_{param},:],A) \qquad \text{(eq. 2)}$$

Here, $z_X (\in \mathbb{R}^{N \times M})$ is a tensor indicating the first latent value, f is an index of a row of the first latent value, and A indicates the second tensor. f is classified into $f_{update}$ and $f_{param}$ to be calculated, in which $f_{update}$ indicates a set of rows selected as update targets, and $f_{param}$ indicates a set of rows which are not selected as the update targets out of f. Each of $s_f$ and $t_f$ is mapping to be a center of conversion, and $s_f$ indicates a scale and $t_f$ indicates a translation. For example, when expressed by an example of FIG. 2, $z_X[f_{update},:]$ indicates a set of elements of a row to be updated out of $z_X$, and $z_X[f_{param},:]$ indicates a set of elements other than the elements of the row to be updated out of $z_X$. An initial value may be set to $z_X = X$, for example.

In the $l(\leq L_1)$-th update, it is also possible to set that $f_{update} = l$, $f_{param} = \{x | x \text{ being } [1,N] \text{ of rows other than } l, \text{ arranged in order}\}$. In this case, $L_1 = N$ is satisfied. By repeating N times of update, the respective rows, namely, all elements of the first latent value are updated. $s_f$ and $t_f$ are represented as mapping of converting a matrix of $\mathbb{R}^{(N-1) \times M + N \times N \times P}$ into a vector of $\mathbb{R}^{1 \times M}$, for example.

As another example, it is also possible that, in the I-th update, $f_{update}$ is set to I, which is the same as above, but $f_{param}$ is set to one obtained by performing masking by setting the I-th row to 0 and the other rows to 1. In this case, $s_f$ and $t_f$ are represented as mapping of converting a matrix of $\mathbb{R}^{N \times M + N \times N \times P}$ into a vector of $\mathbb{R}^{1 \times M}$ or a matrix of $\mathbb{R}^{N \times M}$, for example. In a case of conversion into a matrix of N×M dimensions, update is performed by applying a mask in which a row corresponding to $f_{update}$ is set to 1 and the other rows are set to 0, at a timing of the update.

In either case, each of $s_f$ and $t_f$ is mapping for calculating parameters, and may also be set to arbitrary mapping having learnable parameters. In particular, the conversion including the graph of A being the second tensor is performed, so that by expressing the mapping by using a neural network capable of dealing with graph data, it becomes possible to efficiently perform learning. For example, by using GNN (Graph Neural Network), GCN (Graph Convolutional Network), Relational GCN, or the like, it becomes possible to make learning more efficient. However, not limited to these methods, and any model may be employed as long as it is a model capable of properly converting graph data and performing training, for example, MLP (Multi-Layer Perception), or the like.

On the other hand, the second converter 120 converts the second tensor into a second latent value. This conversion is also performed similarly to the first converter 100, and by repeating the following mapping $L_2$ times so as to update respective elements of the second latent value with respect to the second tensor at least one time, the second latent value is calculated from the second tensor.

$$z_A[a_{update},:,:] = z_A[a_{update},:,:] \odot (s_a(z_A[a_{param},:,:])) + t_a(z_A[a_{param},:,:]) \quad \text{(eq. 3)}$$

Here, $z_A (\in R^{N \times N \times P})$ is a tensor indicating the second latent value, and a indicates an index of a row of the second latent value. a is classified into $a_{update}$ and $a_{param}$ to be calculated, in which $a_{update}$ indicates a set of rows selected as update targets, and $a_{param}$ indicates a set of rows which are not selected as the update targets out of a. Each of $s_a$ and $t_a$ is mapping to be a center of conversion, and $s_a$ indicates a scale and $t_a$ indicates a translation. For example, when expressed by an example of FIG. 2, $z_A[a_{update},:,:]$ indicates a set of elements of a row to be updated by the number of patterns out of $z_A$, and $z_A[a_{param},:,:]$ indicates a set of elements other than the elements of the row to be updated by the number of patterns out of $z_A$. An initial value may be set to $z_a = A$, for example.

In the I ($<L_2$)-th update, it is also possible to set that $a_{update} = I$, $a_{param} = \{y | y \text{ being } [1,N] \text{ of rows other than } I,$ arranged in order$\}$. In this case, $L_2 = N$ is satisfied. By repeating N times of update, the respective rows, namely, all elements of the second latent value are updated. $s_a$ and $t_a$ are represented as mapping of converting a matrix of $R^{N \times N \times P}$ into a vector of $R^{1 \times N \times P}$, for example.

As another example, it is also possible that, in the I-th update, $a_{update}$ is set to I, which is the same as above, but $a_{param}$ is set to one obtained by performing masking by setting the I-th row to 0 and the other rows to 1. In this case, $s_a$ and $t_a$ are represented as mapping of converting a matrix of $R^{N \times N \times P}$ into a vector of $R^{1 \times N \times P}$ or a matrix of $R^{N \times N \times M}$, for example. In a case of conversion into a matrix of N×N×M dimensions, update is performed by applying a mask in which a row corresponding to $a_{update}$ is set to 1 and the other rows are set to 0 in all patterns, at a timing of the update.

In either case, each of $s_a$ and $t_a$ is mapping for calculating parameters, and may also be set to arbitrary mapping having learnable parameters. Any model may be employed as long as it is a model capable of performing training by using machine learning, such as MLP (Multi-Layer Perception), for example.

Note that in the repetition in the mapping of determining the first latent value and the second latent value, the designation is performed for each row. However, not limited to the update in a unit or row, and it is also possible to set elements which are to be updated and elements which are not to be updated, for each element of a tensor. Specifically, (eq. 2) may be rewritten as follows, for example.

The same applies to (eq. 3) and the like, and the designation may be performed for, not each row but each element.

$$z_X[f_{update}] = z_X[f_{update}] \odot \exp(s_f(z_X[f_{param}], A)) + t_f(z_X[f_{param}], A) \quad \text{(eq. 4)}$$

In this case, $f_{update}$ is a set of indices of elements to be update targets, and $f_{param}$ is a set of indices of elements other than the above. Also in this case, the order of selecting the elements to be updated, is set to a predetermined order in conversion and inverse conversion. Specifically, as long as the predetermined order is kept in respective phases of training and inference, the update in the conversion of determining the first latent value and the second latent value from the first tensor and the second tensor, may also be performed in an arbitrary unit of element and an arbitrary order.

Further, although the I-th row is set as the update target in the I-th update in the above description, it is also possible to switch a value of the row to be the update target in a predetermined order so that all rows are updated. The inverse conversion is executed in an order opposite to the predetermined order. This predetermined order may be previously defined by a random number and fixed when performing training and inference. Further, also when the update is performed in a unit of row, there is no need to perform the update one row by one row, and the update may be performed in a predetermined order for each of plural rows so that all rows are updated. As described above, it is only required to perform conversion by which all elements of the latent values are updated.

For example, as described above, when it is set that the I-th row is updated in the I-th update in the conversion in the first converter 100 and the conversion in the second converter 120, $L_1 = L_2$ is satisfied, but not limited to this. Further, although attention is focused on the row of the node, it is also possible to focus attention on columns of feature amount in the first tensor and perform conversion by classifying the columns into a column which is to be updated and a column which is not to be updated. In the second tensor, it is set to update the rows of the same nodes of all patterns, for example, but not limited to this, and it is possible to freely set elements which are to be updated and elements which are not to be updated. Further, with respect to the element to be updated, all the other elements are converted, but not limited to this. Specifically, with respect to the element to be updated, not all the other elements but at least part of elements may be used to perform the update.

It is set that the values of X and A are directly used as the initial values of $z_X$ and $z_A$, but not limited to this. It is also possible to perform predetermined processing, for example, noise superimposition on the values of X and A, to thereby obtain the initial values of $z_X$ and $z_A$.

Referring back to FIG. 1, the trainer 16 executes training to optimize the first converter 100 and the second converter 120. The training targets are respective conversions of $s_f$, $t_f$, $s_a$, and $t_a$. As described above, the configuration of networks provided for these conversions can be freely decided. The trainer 16 performs the training through methods of machine learning and deep learning capable of optimizing these conversions. For example, it is possible to perform training by using a method of SGD (Stochastic Gradient Descent). It is of course possible to use a method of machine learning other than the above.

When using SGD, the trainer 16 calculates a log likelihood based on the following equation, and performs training so as to increase the likelihood.

$$\log(p(G)) = \log(p_z(z)) + \log\left(\left|\det\frac{\partial z}{\partial G}\right|\right) \quad \text{(eq. 5)}$$

z is a combined latent value, and is obtained by combining the first latent value and the second latent value. More concretely, z is a vector having all values of the first latent value and the second latent value, obtained in a manner that elements configuring respective tensors are combined in the order of, from the first column to the M-th column of the first row of the first latent value $z_X$, from the first column to the M-th column of the second row of the first latent value $z_X$, ..., from the first column to the M-th column of the N-th row of the first latent value $z_X$, from the first column to the N-th column of the first row of the first pattern of the second latent value $z_A$, ..., from the first column to the N-th column of the N-th row of the first pattern of the second latent value $z_A$, from the first column to the N-th column of the first row of the second pattern of the second latent value $z_A$, ..., and from the first column to the N-th column of the N-th row of the P-th pattern of the second latent value $z_A$. Further, $p_z(z)$ is a prior distribution with respect to the combined latent value z, and is generated by utilizing a multidimensional normal distribution having dimensions whose number is the same as the number of elements of z, for example. $\partial z/\partial G$ being a target of det is a Jacobian matrix of z at a value of G=(A,X), and a content of log of the second term on the right side is Jacobian.

By defining the first converter 100 and the second converter 120 as represented by (eq. 2) and (eq. 3), it becomes possible to set the Jacobian matrix to a block triangular matrix. For this reason, it becomes possible to reduce a cost for calculating the Jacobian. In like manner, by defining the conversions so as to be represented by these equations, it also becomes possible to define the inverse conversions. It should be noted that the same applies to a case where the equations are further generalized like (eq. 4), as a matter of course.

After the first latent value and the second latent value are converted through repetitive updates by the first converter 100 and the second converter 120, the trainer 16 calculates the log likelihood based on (eq. 5). First, the trainer 16 acquires the latent value z being the combined value of the converted first latent value and second latent value, calculates the Jacobian at the value of G, and calculates the log likelihood by (eq. 5) based on prior probability. By performing learning based on the calculated log likelihood, the respective conversions of $s_f$, $t_f$, $s_a$, and $t_a$ are optimized. By using the normal distribution as the prior probability, training is performed so that a distribution of the latent values of the graph indicating the feature amount and the structure becomes the normal distribution.

When using SGD, it is possible to set that part of the parameters of $s_f$, $t_f$, $s_a$, and $t_a$ are not updated, without updating all of the parameters. For example, when the prior distribution $p_z$ is set to the multidimensional normal distribution, an average vector of this normal distribution may be set to a zero vector. As another example, a covariance matrix of the normal distribution may be set to a diagonal matrix.

Note that the method of optimization is not limited to this, and it is also possible that random numbers according to the normal distribution are used as supervised data and optimization is performed through another supervised learning so that converted data follows the normal distribution, for example. The method of optimization is not limited to SGD, and it is also possible to use optimization methods of various kinds of neural networks. Further, mini-batch processing or the like may be used for the processing with respect to plural pieces of graph data, to thereby improve the efficiency and the accuracy. The trainer 16 optimizes $s_f$, $t_f$, $s_a$, and $t_a$ based on outputs of the first converter 100 and the second converter 120 with respect to the plural pieces of graph data, by using various kinds of methods as described above. A termination condition of the optimization is also decided based on the method to be used.

The output part 18 outputs the parameters of networks optimized by the trainer 16, and the like. Note that the output in the present embodiment is a concept including not only the output to the outside of the training device 1 via an interface but also storage of the optimized parameters and the like in the storage 12 in the training device 1.

Figure 3:
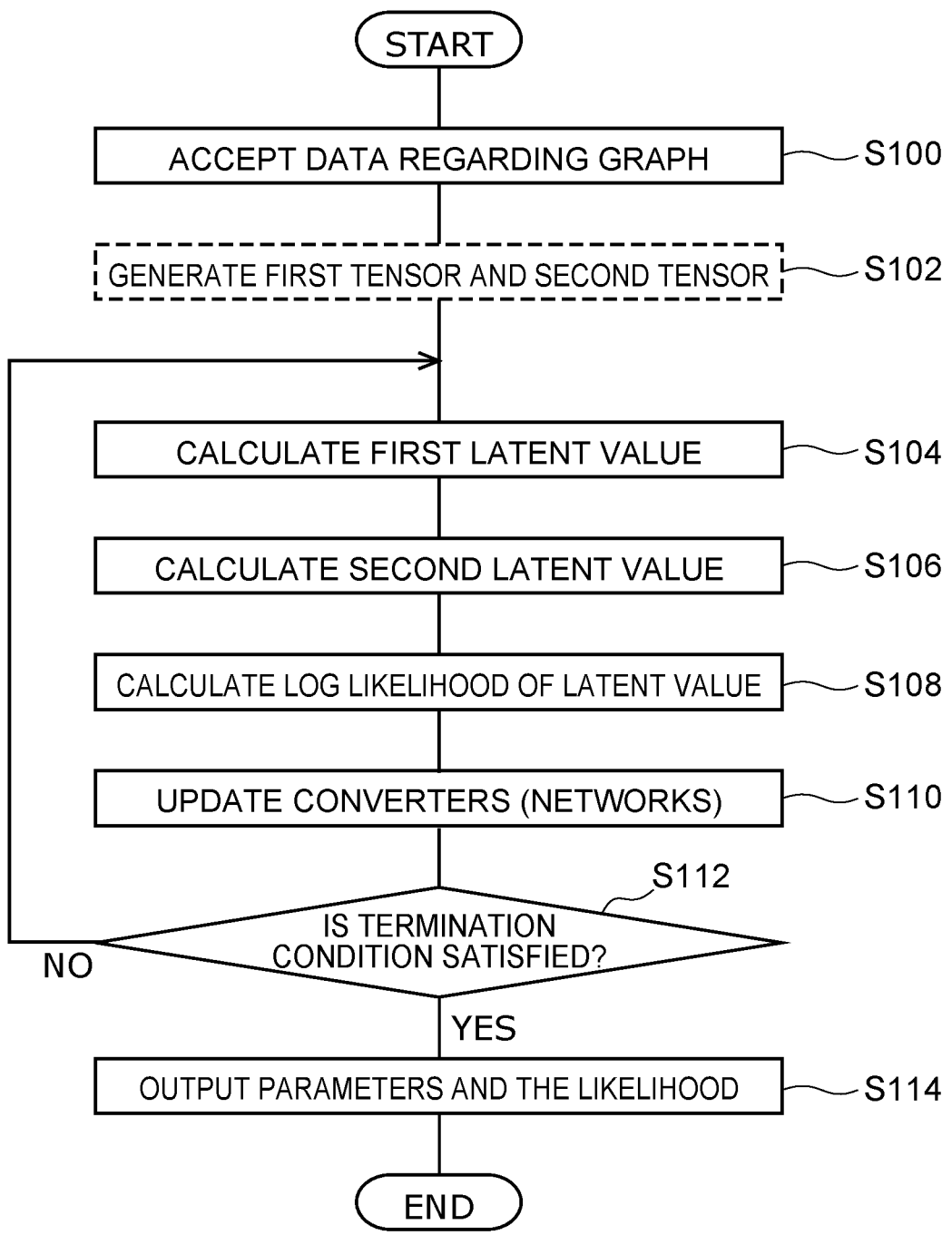
FIG. 3 is a flowchart illustrating a flow of processing performed by a training device according to an embodiment.

FIG. 3 is a flowchart illustrating a flow of processing performed by the training device 1. The operations of the respective parts described above will be briefly summarized by using this FIG. 3. Please refer to the above description regarding detailed operations.

First, data regarding a graph is acquired via the input part (S100).

Next, the first tensor and the second tensor are generated by the processing part 14 if needed (S102).

Next, the first latent value is calculated by using the first converter 100 (S104).

Next, the second latent value is calculated by using the second converter 120 (S106). Note that the order of calculating the first latent value and the second latent value is not limited to this. For example, the processing of S104 may be performed after S106, and S104 and S106 may also be performed concurrently.

Next, the trainer 16 calculates the log likelihood of the latent value (S108).

Next, the trainer 16 updates, based on the calculated log likelihood, the parameters regarding the neural networks provided for the first converter 100 and the second converter 120 (S110). For example, the trainer 16 performs error backward propagation based on the log likelihood, and updates the various kinds of parameters. Although the processing with respect to one piece of graph data regarding this update has been explained in the above description, a log likelihood with respect to plural pieces of graph data is determined to update the networks. For example, it is also possible to perform so-called batch learning in which one set of parameters of neural networks are set with respect to all pieces of graph data being training data, and the one set of parameters are updated to increase the log likelihood with respect to the all pieces of graph data. As another example, it is also possible that the training data is divided into a predetermined number mini-batches, and update is performed through so-called mini-batch learning. This processing can be appropriately changed according to available resources.

Next, the trainer 16 judges whether or not the training satisfies the termination condition (S112). When the termination condition is not satisfied (S112: NO), the processing from S104 is repeated. When the first tensor and so on are appropriately deleted due to a problem of resources such as a memory, the processing may be repeated from S102.

When the termination condition is satisfied (S112: YES), the output part 18 outputs the optimized parameters of networks, and so on (S114), and terminates the processing.

As described above, according to the present embodiment, in the state where the number of node and the number of feature amount are set, the mapping of converting the graph data into the latent values, for example, the latent values according to the normal distribution is optimized by the method using GCN, GNN, or another network, which enables to suppress a calculation cost and to perform training with high accuracy. Further, the aforementioned first converter 100 and second converter 120 can easily define inverse operations, which means that the training device 1 performs the optimization of conversion from the graph data into the latent values, and in addition to that, it can also easily perform optimization of inverse conversion from the latent values into the graph data to be described below.

According to the model trained as above, when a prediction model such as a simple linear regression model is used in a space of latent variable z, it becomes possible to predict, with high accuracy, a value of z and a characteristic value of a substance possessed by a compound graph generated from the value, for example, solubility to water or the like. On the contrary, by selecting z by which the predicted value becomes high, it is possible to efficiently generate a graph which is highly likely to be good.

For example, in a generation model based on GAN, when certain graph data is encoded and then decoded, it is not always possible to generate the same graph data, and thus it is not easy to verify correctness and reliability of training and so on. Further, in a generation model based on VAE, since an approximate value of likelihood is set to a target value, correctness of training can be verified, but there is no guarantee that reproducibility in interconversion between an internal expression of a trained network and graph data becomes high. In an incremental method, validity of a graph is checked every time one node is operated, so that the operation of graph can be terminated at a proper timing, but due to this, a termination determination is required, and further, it is difficult to define a size of a graph of a product. In a one-shot method, it is always possible to generate a graph of a designated size, but when the number of node is increased, a cost regarding learning (training) of a model and generation of the graph is quickly increased, and thus it is difficult to generate a graph with a large number of nodes. The problems as described above can be solved by the present embodiment.

Figure 4:
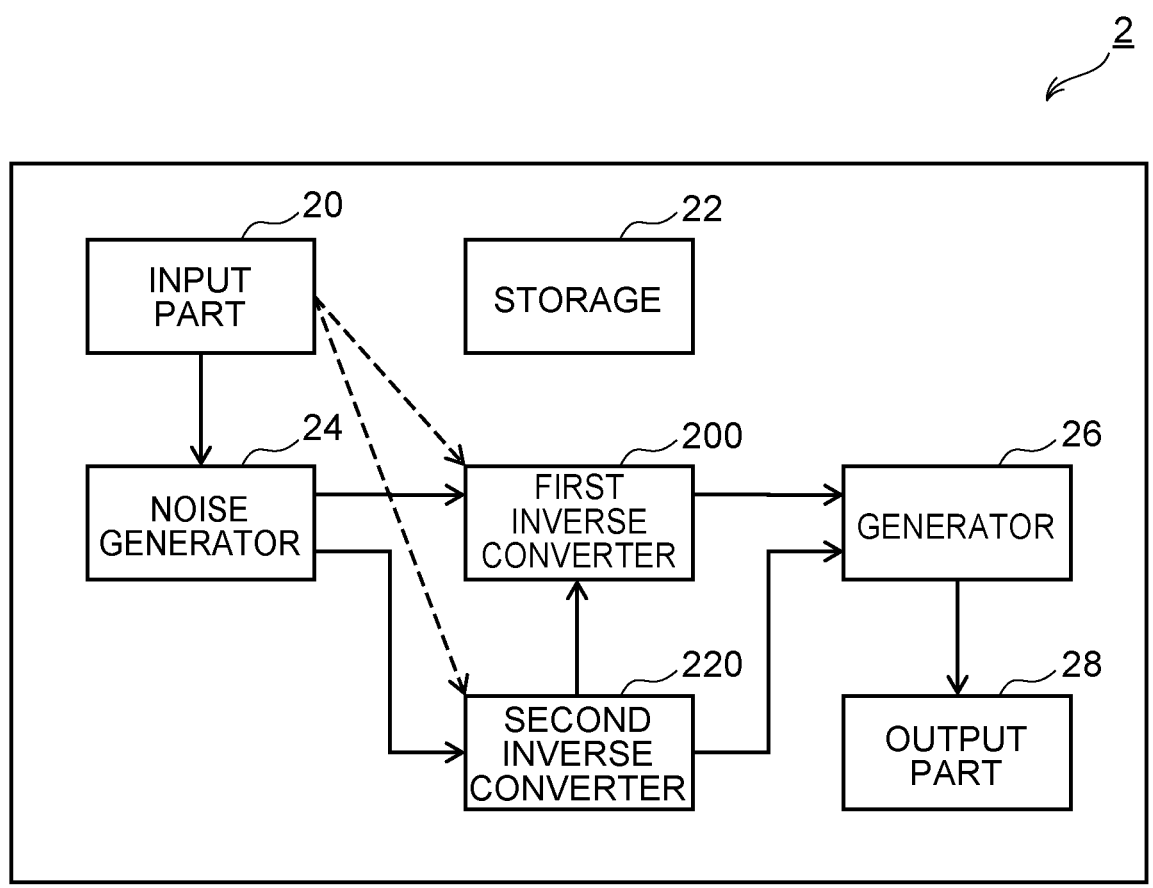
FIG. 4 is a block diagram illustrating a function of an inferring device according to an embodiment.

FIG. 4 is a block diagram illustrating a function of an inferring device 2 according to the present embodiment. The inferring device 2 includes an input part 20, a storage 22, a noise generator 24, a first inverse converter 200, a second inverse converter 220, a generator 26, and an output part 28. The inferring device 2 generates, from input random number information or noise data generated by the noise generator 24, graph data based on a distribution of the random number information or the noise data. Specifically, the inferring device 2 may function as a graph generation device which generates a graph from predetermined data.

The input part 20 acquires data. The data includes, for example, first data having N×M elements and second data having N×N×P elements. This data may be numeric values based on random numbers set by, for example, a normal distribution, a uniform distribution, or the like. Further, this data may also be data having values which are arbitrarily selected by a user. The data acquired by the input part 20 may also be temporarily stored in the storage 22.

The storage 22 stores data and so on required for the inferring device 2. The storage 22 may also store a program for operating the inferring device 2, data used for the inference performed by the inferring device 2, and so on, similarly to the above-described training device 1.

The noise generator 24 generates, when the random number data is not input therein from the input part 20, the first data and the second data. In this case, an instruction made by a user that, for example, random number data is generated to generate a graph, may be issued from the input part 20. Upon reception of this instruction, the noise generator 24 generates the random number data.

The second inverse converter 220 converts the second data, which is set to a second latent value, into a second tensor indicating a structure of a graph. This second inverse converter 220 is a converter which performs inverse conversion of the second converter 120 having the learned model optimized by the above-described training device 1. As described above, by properly defining the second converter 120, it becomes possible to define the second inverse converter 220 as the inverse conversion of the second converter 120. For example, when the second converter 120 is defined by MLP, MLP being inverse conversion of the above-described MLP is defined as the second inverse converter 220. The same applies to a case of network based on another format. More concretely, the second inverse converter 220 is defined by an equation which performs inverse conversion of the equation of (eq. 3). For example, the $L_2$-th update of the conversion of the second converter 120 is first inverse-converted, and inverse conversion is successively performed up to the first update, to thereby define the second inverse converter 220.

The first inverse converter 200 converts the first data, which is set to a first latent value, into a first tensor indicating a node feature amount, by using the second tensor converted by the second inverse converter 220. This first inverse converter 200 is a converter which performs inverse conversion of the first converter 100 having the learned model optimized by the above-described training device 1. By properly defining the first converter 100, it is possible to define the first inverse converter 200 as the inverse conversion of the first converter 100, similarly to the second inverse converter 220. When the first converter 100 performs the conversion of GNN, GCN, or the like, the first inverse converter 200 is defined as inverse conversion of the conversion of GNN, GCN, or the like. More concretely, the first inverse converter 200 is defined by an equation which performs inverse conversion of the equation of (eq. 2). The update is performed in a manner same as that of the second inverse converter 220, so that its explanation will be omitted.

The generator 26 generates graph data based on the first tensor converted by the first inverse converter 200 and the second tensor converted by the second inverse converter 220. Note that the generator 26 is not an essential component.

The output part 28 outputs the graph data generated by the generator 26. When the generator 26 is not provided, the output part 28 may output values of the first tensor and the second tensor.

Figure 5:
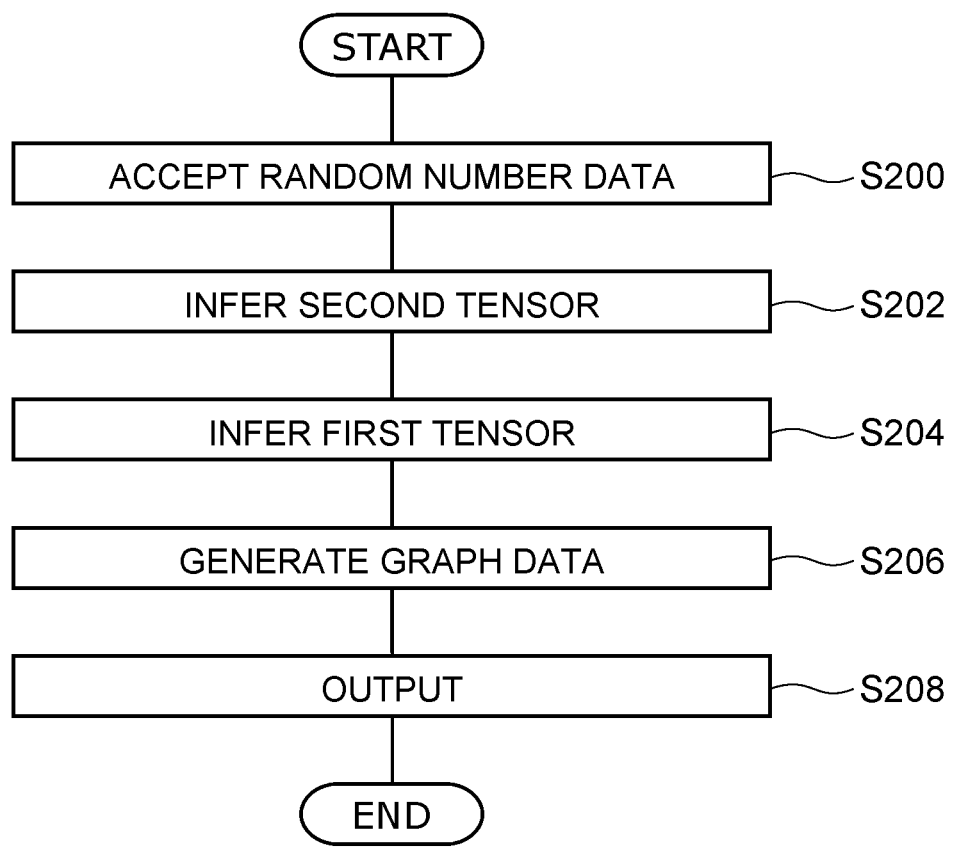
FIG. 5 is a flowchart illustrating a flow of processing performed by a training device according to an embodiment.

FIG. 5 is a flowchart illustrating a flow of processing performed by the inferring device 2 according to the present embodiment.

First, the input part 20 acquires the first data and the second data (S200). This step may be omitted, and when it is omitted, for example, a step in which the noise generator 24 generates random number data is executed instead.

Next, the second tensor is inferred by the second inverse converter 220 based on the second data (S202).

Next, the first tensor is inferred by the first inverse converter 200 based on the first data and the second data inferred in S202 (S204).

Next, the generator 26 generates the graph data based on the first tensor and the second tensor (S206).

Next, the output part 28 outputs the generated graph data (S208). When the first tensor and the second tensor are output as they are, the step of S206 is omitted and the output part 28 outputs the inferred first tensor and second tensor.

As described above, according to the inferring device 2 according to the present embodiment, it becomes possible to convert, with high accuracy, the random number data into the graph, by using the first inverse converter 200 and the second inverse converter 220 which are defined based on the first converter 100 and the second converter 120, respectively, which are trained by the above-described training device 1. The inverse converters according to the present embodiment perform the inference (generation) of the graph from the distribution of random numbers (latent values), so that by changing this distribution, it becomes possible to easily infer (generate) a different graph. At the same time, when inference is performed from the same distribution, the same graph data is obtained. Specifically, when certain graph data is converted by the first converter 100 and the second converter 120, and the first inverse converter 200 and the second inverse converter 220 execute conversion based on the converted latent values, graph data same as the input graph data is output.

Besides, since the graph is generated based on N, M, P, the graph is inferred in one-shot. On the other hand, although the one-shot method is employed, according to the training device 1 of the present embodiment, even if the number of node is increased, a learning cost of the model is not increased so much because of the easiness of calculation of Jacobian and definition of the inverse conversion described above, and thus it becomes possible to generate, with high accuracy, a graph with a large number of nodes.

MODIFIED EXAMPLE

Figure 6:
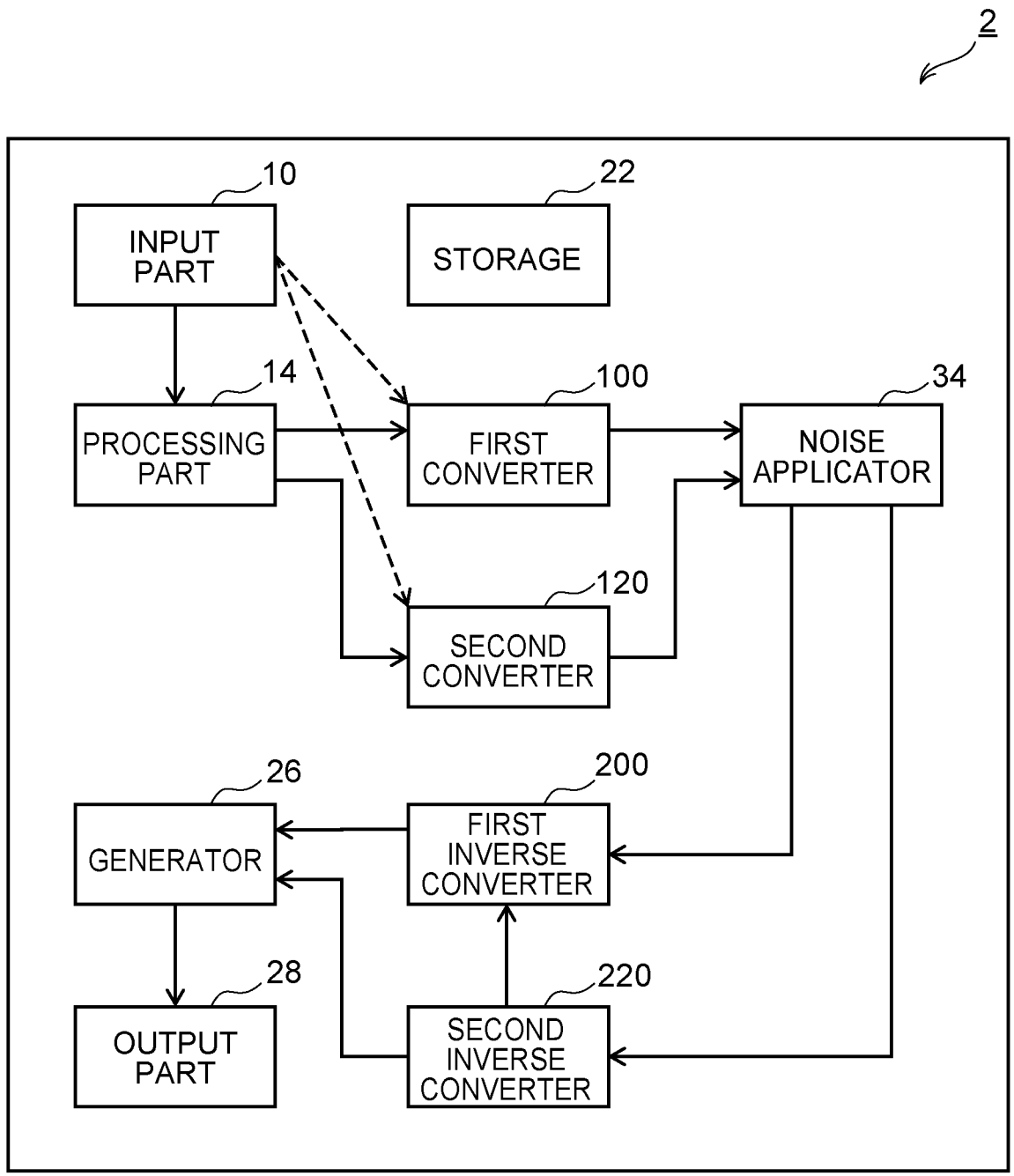
FIG. 6 is a block diagram illustrating a function of an inferring device according to an embodiment.

FIG. 6 is a block diagram illustrating a function of an inferring device 2 according to another embodiment. The inferring device 2 according to the present modified example includes an input part 20, a storage 22, a first inverse converter 200, a second inverse converter 220, a generator 26, and an output part 28, and it further includes a noise applicator 30, and the first converter 100 and the second converter 120 after being subjected to learning by the training device 1. When, for example, certain graph data is input in the inferring device 2, the inferring device 2 automatically infers and outputs graph data near the above-described graph data.

The configurations denoted by the same reference numerals are the same as those of the training device 1 or the inferring device 2 according to the above-described embodiments, unless otherwise specified, so that their detailed explanations will be omitted.

The first converter 100 is a converter including a learned model trained by the training device 1. In the same manner, the second converter 120 is also a converter including a learned model trained by the training device 1.

The noise applicator 30 applies noise to the first latent value converted from the first tensor by the first converter 100 and the second latent value converted from the second tensor by the second converter 120. A level, dispersion, and an average value of the noise to be applied, a pattern of random numbers, a method of generating random numbers, and so on may be set by a user. Further, the noise may be applied to both of the latent values or either of the latent values.

The first inverse converter 200 and the second inverse converter 220 convert data of the noise-applied latent values, and infer the first tensor and the second tensor, respectively.

As described above, when the graph data is input in the inferring device 2 according to the present modified example, the inferring device 2 converts the graph data into the latent values, performs the inverse conversion after applying the noise to the latent values, and outputs the graph data.

Figure 7:
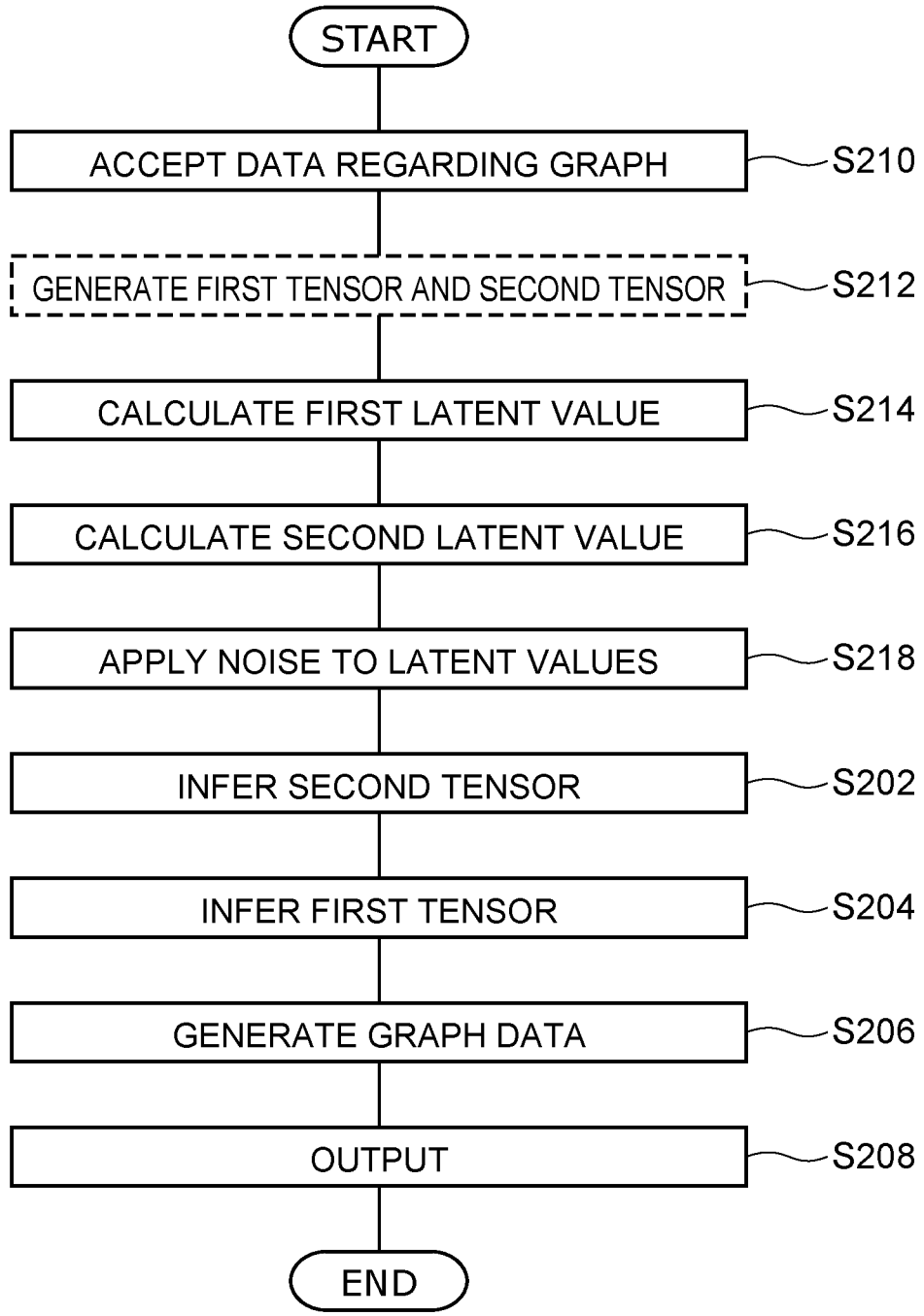
FIG. 7 is a flowchart illustrating a flow of processing performed by an inferring device according to an embodiment.

FIG. 7 is a flowchart illustrating a flow of processing performed by the inferring device 2 according to the present modified example.

First, the input part 10 acquires data regarding a graph (S210).

Next, the first tensor and the second tensor are generated by the processing part 14 if needed (S212).

Next, the first latent value is calculated by using the first converter 100 including the learned model (S214).

Next, the second latent value is calculated by using the second converter 120 including the learned model (S216). Note that the order of calculating the first latent value and the second latent value is not limited to this. For example, the processing of S214 may be performed after S216, and S214 and S216 may also be performed concurrently.

Next, the noise applicator 30 applies noise to the calculated first latent value and second latent value (S218).

The flow thereafter is the same as that of the inferring device 2 according to the above-described embodiment, and thus explanation thereof will be omitted.

As described above, according to the present modified example, by applying the noise to the graph data converted by using the first converter 100 and the second converter 120 trained in the training device 1, it becomes possible to infer graph data near the above-described graph data. When the noise is not applied, a graph same as the input graph may also be generated. When the same graph is generated as described above, it can be confirmed that the respective converters trained in the training device 1 and the respective inverse converters are functioned normally.

Note that in FIG. 6, the first converter 100 and the first inverse converter 200 are configured separately, but it is also possible to design such that the conversion and the inverse conversion can be performed in the same module. Specifically, the first converter 100 and the first inverse converter 200 may also be included in the same module. The same applies to the second converter 120 and the second inverse converter 220.

As described above, the inferring device 2 infers the graph from the (random number) data generated by a user, the data generated by the noise generator 24, or the data obtained by applying the noise to the latent values converted from the graph. Further, as another example, it is also possible that noise data generated by the noise generator 24 is added to the data generated by a user, and the graph is inferred from the data. When the noise data is added to the input data, it is also possible that the noise applicator 30 illustrated in FIG. 6 is provided in the configuration in FIG. 4, and the noise applicator 30 applies the noise to the input data. The noise applicator 30 may apply the noise to at least one of the first data and the second data included in the input data.

For example, when a first graph is inferred as graph data, it is also possible to generate the first graph from input data, noise data, or the input data to which noise is added. As another example, it is also possible that a second graph which is similar to a graph to be generated is input, latent values of the second graph are determined by converters, and the first graph is generated from the latent values of the second graph.

Further, although the aforementioned inferring device 2 and the inferring device 2 according to the modified example are configured separately from the training device 1, the configuration is not limited to this. For example, it is also possible that the training device 1 and the inferring device 2 are provided in the same apparatus, in which the training is performed in the training device 1 and then the apparatus is directly functioned as the inferring device 2. It is also possible to design such that a user can switch the training device 1 and the inferring device 2 via a user interface. Further, it is also possible that the functions possessed by the training device 1 and the inferring device 2 are implemented by plural computers, and the respective computers exchange information via a network.

In the training device 1 and the inferring device 2 according to some embodiments, each function may be implemented by a circuit constituted by an analog circuit, a digital circuit, or an analog/digital mixed circuit. A control or manage circuit which controls or manages each function may be included in the training device 1 and the inferring device 2. Each circuit may be implemented as an ASIC (application specific integrated circuit), an FPGA (field programmable gate array), or the like.

In all of the foregoing explanations, at least a part of the training device 1 and the inferring device 2 may be constituted by hardware, or by software and a Central Processing Unit (CPU) or the like may implement the function through information processing of the software. When it is constituted by software, programs that enable the training device 1, the inferring device 2 and at least a part of the functions may be stored in storage media, such as a flexible disk and a CD-ROM, and may be executed by being read by a computer. The storage media are not limited to detachable media such as a magnetic disk or an optical disk, and may include fixed storage media such as a hard disk device and a memory. That is, the information processing may be concretely implemented using hardware resources. For example, the processing may be implemented on a circuit such as the FPGA, and may be executed by hardware. The generation of the models and the subsequent processing of the model input may be performed by using, for example, an accelerator such as a Graphics Processing Unit (GPU).

For example, a computer may be programmed to act according to the above embodiments by dedicated software stored in a computer-readable storage medium. The kinds of storage media are not limited. The computer may be used to implement a device according to the embodiment by installing dedicated software on the computer, e.g., by downloading the software through a communication network. The information processing is thereby concretely implemented using hardware resources.

Figure 8:
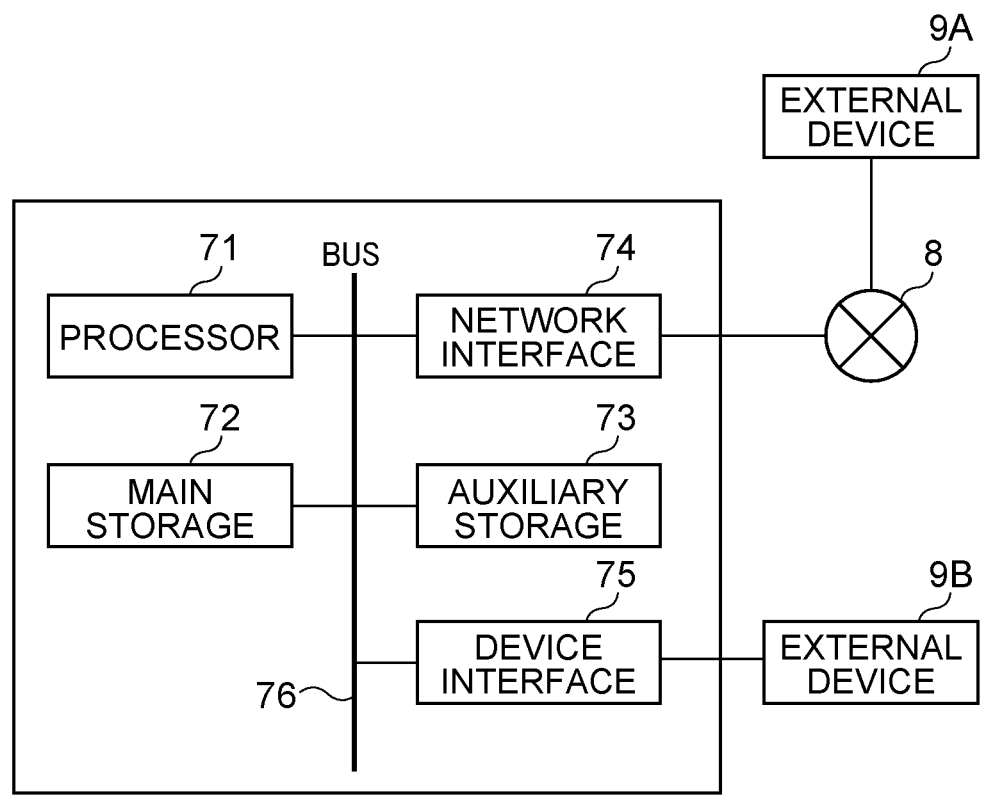
FIG. 8 is a diagram illustrating a hardware implementation example according to an embodiment.

FIG. 8 is a block diagram illustrating an example of a hardware configuration according to some embodiments of the present disclosure. The training device 1 and the inferring device 2 may include a computing device 7 having a processor 71, a main storage 72, an auxiliary storage 73, a network interface 74, and a device interface 75, connected through a bus 76.

Although the computing device 7 shown in FIG. 8 includes one of each component 71-76, a plurality of the same components may be included. Moreover, although one computing device 7 is illustrated in FIG. 8, the software may be installed into a plurality of computing devices, and each of the plurality of computing devices may execute a different part of the software process.

The processor 71 may be an electronic circuit (processing circuit) including a control device and an arithmetic logic unit of the computer. The processor 71 may perform arithmetic processing based on data and programs input from each device or the like of an internal configuration of the computing device 7, and output arithmetic operation results and control signals to each device or the like. For example, the processor 71 may control each component constituting the computing device 7 by executing an OS (operating system), applications, and so on, of the computing device 7. The processor 71 is not limited to a particular processor and may be implemented by any processor capable of performing the above-stated processing.

The main storage 72 may store instructions executed by the processor 71, various data, and so on, and information stored in the main storage 72 may be directly read by the processor 71. The auxiliary storage 73 may be a storage other than the main storage 72. These storages may be implemented using arbitrary electronic components capable of storing electronic information, and each may be a memory or a storage. Both a volatile memory and a non-volatile memory can be used as the memory. The memory storing various data in the training device 1 and the inferring device 2 may be formed by the main storage 72 or the auxiliary storage 73. For example, at least one of the storages 12 or 22 for the training device 1 and the inferring device 2 may be implemented in the main storage 72 or the auxiliary storage 73. As another example, at least a part of the storage 30 or a part of the storages 12 or 22 may be implemented by a memory which is provided at the accelerator, when an accelerator is used.

The network interface 74 may be an interface to connect to a communication network 8 through a wire or wireless interface. An interface which is compatible with an existing communication protocol may be used as the network interface 74. The network interface 74 may exchange information with an external device 9A which is in communication with computing device 7 through the communication network 8.

The external device 9A may include, for example, a camera, a motion capture device, an output destination device, an external sensor, an input source device, and so on. The external device 9A may be a device implementing a part of the functionality of the components of the training device 1 and the inferring device 2. The computing device 7 may transmit or receive a part of processing results of the training device 1 and the inferring device 2 through the communication network 8, like a cloud service.

The device interface 75 may be an interface such as a USB (universal serial bus) which directly connects with an external device 9B. The external device 9B may be an external storage medium or a storage device. At least part of the storage may be formed by the external device 9B.

The external device 9B may include an output device. The output device may be, for example, a display device to display images, and/or an audio output device to output sounds, or the like. For example, there external device may include an LCD, (liquid crystal display), a CRT (cathode ray tube), a PDP (plasma display panel), a speaker, and so on. However, the output device is not limited to these examples.

The external device 9B may include an input device. The input device may include devices such as a keyboard, a mouse, a touch panel, or the like, and may supply information input through these devices to the computing device 7. Signals from the input device may be output to the processor 71.

In the present specification, the representation of "at least one of a, b and c" or "at least one of a, b, or c" includes any combination of a, b, c, a-b, a-c, b-c and a-b-c. It also covers combinations with multiple instances of any element such as a-a, a-b-b, a-a-b-b-c-c or the like. It further covers adding other elements beyond a, b and/or c, such as having a-b-c-d.

Furthermore, when performing the live migration, there is no guarantee that the dump will be acquired at the same timing when the program contains host-related information such as IP address or time-dependent operations, and the process may be complicated and difficult to execute. On the other hand, according to this embodiment, even in such cases, it is possible to cope with changes in an execution environment such as hardware by using software level snapshots.

Further, part or all of the processing, means, and so on of the present disclosure may be executed or functioned based on at least one of a control circuit and a storage circuit provided on the cloud via a network.

Although addition, effects, or various kinds of modifications of the embodiments may be conceived based on the above-described entire description, examples of the present embodiments are not limited to the above-described individual embodiments. Various kinds of addition, changes and partial deletion can be made within a range that does not depart from the conceptual idea and the gist of the present embodiments derived from the contents stipulated in claims and equivalents thereof. For example, in all of the embodiments described above, the equations and the numeric values used for the explanation are indicated as examples, and the equations and the numeric values are not limited to these.

Various kinds of calculation for learning and inference may be carried out through parallel processing by using an accelerator such as a GPU or by using plural calculating machines via a network. For example, batch processing in the learning, and processing such as generation of operation information of each object in the inference may be executed at the same timing by dividing the calculation among plural arithmetic cores.

The invention claimed is:

1. A training device comprising:
one or more memories; and
one or more processors configured to:
convert, by using a first converter including a first neural network model, a feature regarding a node of a graph and a feature regarding a structure of the graph into a first latent value,
convert, by using a second converter including a second neural network model, the feature regarding the structure of the graph into a second latent value,
train, based on the first latent value and the second latent value, the first neural network model and the second neural network model,
wherein the graph is at least one of a graph of a compound, a graph of a circuit design, a graph of a transportation system, a graph of a network, a graph of architecture, a graph of linguistics, or a graph of a web,
wherein the first converter is a converter that is capable of defining inverse conversion,
wherein the second converter is a converter that is capable of defining inverse conversion,
wherein the one or more processors are further configured to define a first inverse converter and a second inverse converter, the first inverse converter being a converter that is configured to execute, by using the first neural network model, inverse conversion of the first converter, the second inverse converter being a converter that is configured to execute, by using the second neural network model, inverse conversion of the second converter, and
wherein the second inverse converter is configured to generate a feature regarding a structure of another graph and the first inverse converter is configured to generate a feature regarding a node of the another graph.

2. The training device according to claim 1, wherein the one or more processors are configured to perform, based on nonlinear mapping, the conversion by the first converter and the conversion by the second converter.

3. The training device according to claim 2, wherein the one or more processors are configured to execute the mapping based on NVP (Non-volume Preserving) mapping.

4. The training device according to claim 1, wherein the one or more processors are configured to calculate the first latent value by applying multiple mappings on the feature regarding the node of the graph and the feature regarding the structure of the graph; and
the one or more processors are configured to calculate the second latent value by applying multiple mappings on the feature regarding the structure of the graph.

5. The training device according to claim 1, wherein the graph is the graph of the compound,
the feature regarding the node of the graph is information regarding an atom of the compound, and
the feature regarding the structure of the graph is information regarding an adjacent state.

6. The training device according to claim 1, wherein the feature regarding the node of the graph is a first tensor indicating a node feature of the graph; and
the feature regarding the structure of the graph is a second tensor indicating the structure of the graph.

7. The training device according to claim 6, wherein the one or more processors are further configured to process acquired data regarding the graph into the first tensor and the second tensor, the second tensor including an adjacency matrix of the graph.

8. The training device according to claim 1, wherein the one or more processors are configured to train the first neural network and the second neural network so that the first latent value and the second latent value follow a predetermined distribution.

9. The training device according to claim 1, wherein the one or more processors train the first neural network and the second neural network based on a prior distribution with respect to the first latent value and the second latent value.

10. An generation device comprising:
one or more memories; and
one or more processors configured to:
convert second data into a feature regarding a structure of a first graph by using a second inverse converter; and
convert first data into a feature regarding a node of the first graph by using a first inverse converter and the feature regarding the structure of the first graph,
wherein the first graph is at least one of a graph of a compound, a graph of a circuit design, a graph of a transportation system, a graph of a network, a graph of architecture, a graph of linguistics, or a graph of a web, wherein the first inverse converter is defined based on a first converter capable of defining inverse conversion, the first converter including a first neural network model, wherein the second inverse converter is defined based on a second converter capable of defining inverse conversion, the second converter including a second neural network model, wherein the conversion executed by using the first inverse converter is inverse conversion of the first converter, and wherein the conversion executed by using the second inverse converter is inverse conversion of the second converter.

11. The generation device according to claim 10, wherein the first data is data obtained, by the one or more processors, by converting a feature regarding a node of a second graph and a feature regarding a structure of the second graph into a first latent value by using the first converter capable of defining inverse conversion; and the second data is data obtained, by the one or more processors, by converting the feature regarding the structure of the second graph into a second latent value by using the second converter capable of defining inverse conversion.

12. The generation device according to claim 11, wherein the first graph and the second graph are the same graph.

13. The generation device according to claim 10, wherein the first data and the second data are generated based on random numbers.

14. The generation device according to claim 10, wherein the first data and the second data are generated based on a predetermined distribution.

15. The generation device according to claim 10, wherein the one or more processors are further configured to apply noise to at least one of the first data and the second data before converting the first data and the second data.

16. The generation device according to claim 10, wherein the one or more processors are further configured to generate data of the first graph based on the feature regarding the node of the first graph and the feature regarding the structure of the first graph.

17. The generation device according to claim 16, wherein the one or more processors are further configured to generate the first graph by a one-shot method.

18. The generation device according to claim 10, wherein the feature regarding the node of the first graph is a first tensor indicating a node feature of the first graph; and the feature regarding the structure of the first graph is a second tensor indicating the structure of the first graph.

19. The generation device according to claim 10, wherein the first graph is the graph of the compound, the feature regarding the node of the first graph includes information regarding an atom of the compound, and the feature regarding the structure of the first graph includes information regarding an adjacent state.

20. A training method comprising:

converting, by one or more processors, by using a first converter including a first neural network model, a feature regarding a node of a graph and a feature regarding a structure of the graph into a first latent value, converting, by the one or more processors, by using a second converter including a second neural network model, the feature regarding the structure of the graph into a second latent value, training, by the one or more processors, based on the first latent value and the second latent value, the first neural network model and the second neural network model, wherein the graph is at least one of a graph of a compound, a graph of a circuit design, a graph of a transportation system, a graph of a network, a graph of architecture, a graph of linguistics, or a graph of a web, wherein the first converter is a converter that is capable of defining inverse conversion, wherein the second converter is a converter that is capable of defining inverse conversion, wherein the method further comprises defining, by the one or more processors, a first inverse converter and a second inverse converter, the first inverse converter being a converter that is configured to execute, by using the first neural network model, inverse conversion of the first converter, the second inverse converter being a converter that is configured to execute, by using the second neural network model, inverse conversion of the second converter, and wherein the second inverse converter is configured to generate a feature regarding a structure of another graph and the first inverse converter is configured to generate a feature regarding a node of the another graph.

21. A method for generating graph comprising:

converting, by one or more processors, second data into a feature regarding a structure of a first graph by using a second inverse converter;

converting, by the one or more processors, first data into a feature regarding a node of the first graph by using a first inverse converter and the feature regarding the structure of the first graph, wherein the first graph is at least one of a graph of a compound, a graph of a circuit design, a graph of a transportation system, a graph of a network, a graph of architecture, a graph of linguistics, or a graph of a web, wherein the first inverse converter is defined based on a first converter capable of defining inverse conversion, the first converter including a first neural network model, wherein the second inverse converter is defined based on a second converter capable of defining inverse conversion, the second converter including a second neural network model, wherein the conversion executed by using the first inverse converter is inverse conversion of the first converter and, wherein the conversion executed by using the second inverse converter is inverse conversion of the second converter.

* * * * *